(12) United States Patent
Rea

(10) Patent No.: US 8,198,399 B2
(45) Date of Patent: *Jun. 12, 2012

(54) METHOD OF DRYING A MATERIAL HAVING A COHESIVE PHASE

(75) Inventor: Gary S. Rea, Northboro, MA (US)

(73) Assignee: Genzyme Corporation, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/967,270

(22) Filed: Dec. 14, 2010

(65) Prior Publication Data

US 2011/0201760 A1 Aug. 18, 2011

Related U.S. Application Data

(63) Continuation of application No. 12/816,676, filed on Jun. 16, 2010, now Pat. No. 7,879,972, which is a continuation of application No. 12/437,003, filed on May 7, 2009, now abandoned, which is a continuation of application No. 11/821,088, filed on Jun. 21, 2007, now Pat. No. 7,592,417, which is a continuation of application No. 11/372,488, filed on Mar. 9, 2006, now Pat. No. 7,271,237, which is a continuation of application No. 10/744,705, filed on Dec. 23, 2003, now Pat. No. 7,067,614, which is a continuation of application No. 10/074,702, filed on Feb. 13, 2002, now Pat. No. 6,710,162.

(60) Provisional application No. 60/269,327, filed on Feb. 16, 2001.

(51) Int. Cl.
*C08F 6/00* (2006.01)
*C08J 3/00* (2006.01)

(52) U.S. Cl. .............. 528/502 R; 528/480; 604/367; 604/368

(58) Field of Classification Search .............. 528/480; 604/367, 368
See application file for complete search history.

(56) References Cited

U.S. PATENT DOCUMENTS

| | | | | |
|---|---|---|---|---|
| 6,710,162 B2 * | 3/2004 | Rea | ............................... | 528/480 |
| 7,067,614 B2 * | 6/2006 | Rea | ............................... | 528/480 |
| 7,271,237 B2 * | 9/2007 | Rea | ............................... | 528/480 |
| 7,592,417 B2 * | 9/2009 | Rea | ........................... | 528/502 R |
| 7,879,972 B2 * | 2/2011 | Rea | ........................... | 528/502 R |

* cited by examiner

*Primary Examiner* — Terressa Boykin

(57) ABSTRACT

A method for drying a material such as a polymer hydrogel which passes through a cohesive phase as it dries is disclosed. The method comprises agitating a composition while removing liquid until the solids content of the composition reaches a level at which the composition enters a cohesive phase, halting agitation, removing liquid from the composition in the absence of agitation, and resuming agitation. Practice of the present invention can eliminate the problems associated with adhesion of a material to itself and to process equipment during the cohesive phase.

10 Claims, 1 Drawing Sheet

METHOD OF DRYING A MATERIAL HAVING A COHESIVE PHASE

RELATED APPLICATION(S)

This application is a continuation of U.S. patent application Ser. No. 12/816,676, filed Jun. 16, 2010, now U.S. Pat. No. 7,879,972, which is a continuation of U.S. patent application Ser. No. 12/437,003, filed May 7, 2009, now abandoned, which is a continuation of U.S. patent application Ser. No. 11/821,088, now U.S. Pat. No. 7,592,417, filed Jun. 21, 2007, which is a continuation of U.S. patent application Ser. No. 11/372,488, filed Mar. 9, 2006, now U.S. Pat. No. 7,271,237, which is a continuation of U.S. patent application Ser. No. 10/744,705, filed Dec. 23, 2003, now U.S. Pat. No. 7,067,614, which is a continuation of U.S. patent application Ser. No. 10/074,702, filed Feb. 13, 2002, now U.S. Pat. No. 6,710,162, which claims the benefit of U.S. Provisional Application No. 60/269,327, filed on Feb. 16, 2001. The entire teachings of the above application(s) are incorporated herein by reference.

BACKGROUND OF THE INVENTION

A substantial number of materials begin at or pass through a sticky, or cohesive, phase during drying operations. These materials can include food products, polymers, pharmaceuticals and waste streams, among others. Polymer hydrogels are one class of materials that can experience a cohesive phase during drying. Polymer hydrogels are characterized, in part, by their ability to absorb water and retain it under pressure. Polymer hydrogels are widely used in the manufacture of personal hygiene products, but they also have important new pharmaceutical applications.

Many pharmaceutically important materials, such as polymer hydrogels, are initially produced with a higher moisture content than is found in the end product. Accordingly, one of the final steps in the manufacture of such products can include drying the product to an acceptable moisture level. Drying is usually necessary because it helps to minimize transportation and packaging costs. Drying may also stabilize the product against microbial or chemical degradation. Such materials are usually dried in any of a number of commercially available dryers, which typically subject the material to continuous agitation as it dries. The available dryers can vary in the method by which they reduce moisture and by the materials that they can process.

Many polymeric hydrogels experience a cohesive phase at certain levels of moisture content. During this phase, polymer particles adhere with high affinity to each other and to equipment surfaces. This can make drying polymer hydrogels particularly challenging. In dryers that use mechanical agitation, hydrogels in a cohesive phase can cause strain upon and damage to impellers, turbines, and end seal assemblies. The increased torque caused by agitating a material in its cohesive phase can damage or stress the motors and drive systems used to agitate the material. The motors and gearboxes of such driers need to be suitably robust which is reflected in capital and operating costs.

Alternatively, attempts have been made to avoid a cohesive phase. Dry product can be back mixed to lower the moisture content of the dryer feed below the threshold required for the cohesive phase. However, product back mixing can be undesirable in that the size of equipment required is correspondingly increased. Further, product back-mixing is unsuitable for materials which are cohesive at very low moisture content or for materials that are very wet at the beginning of the drying step. Product back-mixing may also be undesirable for the preparation of materials that must meet exact production standards, such as materials for which loss of batch integrity is unacceptable.

Other methods to avoid a cohesive phase use additives to assist in drying, such as azeotrope-forming solvents or agents that affect the surface wetting of the product. However, the use of additives and organic solvents can be detrimental to pharmaceutical purity and generally increases production costs.

A need exists for au improved method to reduce the moisture content of materials that experience a cohesive phase. Manufacturers need a process that will permit processing of these materials without the higher capital, operating and maintenance expenses that can result from practicing conventional drying techniques. Additionally, many manufacturers, such as those in the pharmaceutical industry, need a process that does not use unnecessary additives or solvents and maintains high purity standards.

SUMMARY OF THE INVENTION

This invention relates to a method for drying a material, such as a polymer hydrogel, that experiences a cohesive phase at certain levels of temperature and moisture content. This invention is based, in part, on the discovery that a material can be dried, in the absence of agitation, by applying a vacuum to the material as it passes through a cohesive phase. Thus, the invention allows for the suspension of agitation while a composition passes through its cohesive phase.

The method of the present invention comprises agitating a composition comprising a solid and a liquid while removing the liquid until the solids content of the composition reaches a level at which the composition enters a cohesive phase, halting agitation, removing liquid from the composition in the absence of agitation, and resuming agitation.

Consequently, practice of this invention can eliminate the problems associated with adhesion of the material to itself and to process equipment during the cohesive phase. Practice of the present invention can avoid the need for product back-mixing, for the use of azeotrope-forming solvents, or for the adding of agents that effect the surface wetting of the product. By avoiding these conventional drying techniques, the method of the present invention can help pharmaceutical manufacturers to maintain high purity standards and also to ensure batch integrity. Additionally, since agitation is suspended during the cohesive phase, practice of the present invention can avoid stress, strain, and damage to dryers that use mechanical agitation.

BRIEF DESCRIPTION OF THE DRAWINGS

The FIGURE shows the linear relationship between moisture content and polymer temperature during the cohesive phase of epichlorohydrin cross-linked poly(allylamine hydrochloride).

The foregoing and other objects, features and advantages of the invention will be apparent from the following more particular description of preferred embodiments of the invention.

DETAILED DESCRIPTION OF THE INVENTION

Figure 1:
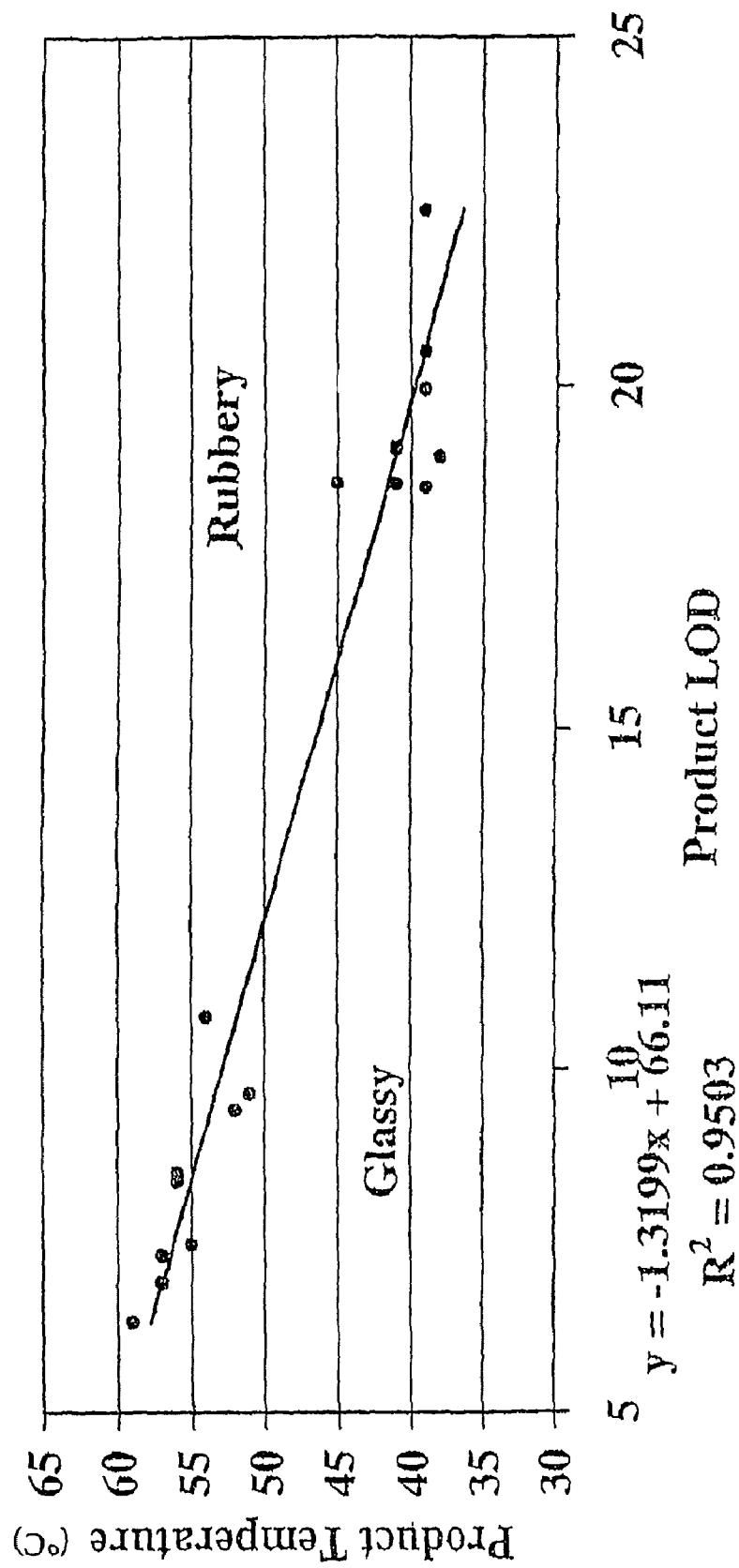

A description of preferred embodiments of the invention follows.

This invention relates to a method for drying a material, such as a polymer hydrogel, that experiences a cohesive phase at certain levels of temperature and moisture content. The method comprises agitating a composition comprising solids and a liquid while removing the liquid until the solids content of the composition reaches a level at which the composition enters a cohesive phase, halting agitation, removing liquid from the composition in the absence of agitation, and resuming agitation. The method of the present invention allows the suspension of agitation while a composition passes through its cohesive phase and thereby avoids the disadvantages associated with conventional drying techniques. Practice of the present invention can avoid the need for product back-mixing, for the use of azeotrope-forming solvents, or for the adding of agents that effect the surface wetting of the product. Additionally, since agitation is suspended during the cohesive phase, practice of the present invention can avoid stress, strain, and damage to dryers that use mechanical agitation.

The terms "wet material" or "wet polymer" as used herein refer to compositions that contain a substance that is not a solid at the temperature of the composition. This substance may be, for example, water, an aqueous solution, or an organic solvent.

The term "loss on drying", or "LOD", refers to the weight fraction of a composition that leaves that composition upon drying. Drying losses may be attributable, for example, to water loss or to loss of volatile organic substances.

Materials which undergo a cohesive phase as they dry include, for example, polymer hydrogels, such as epichlorohydrin cross-linked poly(allylamine hydrochloride) described in U.S. Pat. Nos. 5,969,090 and 5,900,475, incorporated by reference in their entirety, and water-insoluble modified polyanionic polysaccharide compositions described in U.S. Pat. Nos. 4,937,270; 5,017,229; and 5,527,893, incorporated by reference in their entirety.

The term "cohesive phase" as used herein refers to a state in which a composition is self-adhering. For instance, polymer particles experiencing this phase can adhere with high affinity to each other and to equipment surfaces. Polymer materials generally experience a cohesive phase at a given temperature during a particular range of moisture content. For example, epichlorohydrin cross-linked poly(allylamine hydrochloride) experiences a cohesive phase at various conditions of moisture and temperature, as is demonstrated in the FIGURE. The onset of the cohesive phase can be detected by fluctuations in the power requirements for agitating a composition. For instance, during the cohesive phase, the power required to agitate a composition can significantly increase.

The term "polymer hydrogel" as used herein refers to a polymeric material that is capable of retaining water near or within the structure of the material. The polymer material may be either a homopolymer or a copolymer. The polymers of the invention may or may not be cross-linked with a cross-linking agent.

A defining characteristic of a polymer hydrogel is the ability of the material to retain water, even under considerable pressure. Generally, the hydrogel is water swellable but is not substantially water soluble. The molecular weight of the final polymerized state; the chemical characteristics of the constituent monomer groups, including the degree of ionization of the salt form; and the chemical characteristics of substituted groups on the polymer chain may all influence the ability of the polymer to retain water. Constituent monomer groups or substituted groups on the polymer chain influence the water holding capacity of the polymer. The hydrophilic character of these structures can determine, at least in part, the water retaining capacity of the polymer hydrogel.

The polymer hydrogels for use in the claimed invention can be organic polymers. The polymers can include, for example, industrial polymers (e.g., for use in ion exchange), absorbent polymers (e.g., for use in disposable diapers), agrochemicals, or, preferably, pharmaceutical polymers.

The polymer hydrogel of the present invention is characterized by a repeating unit having the formula

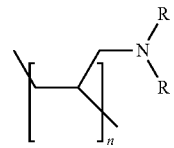

or a copolymer thereof, wherein n is an integer and each R, independently, is or a lower alkyl (e.g., having between 1 and 5 carbon atoms, inclusive), alkylamino (e.g., having between 1 and 5 carbons atoms, inclusive, such as ethylamino) or aryl (e.g., phenyl) group; a repeating unit having the formula

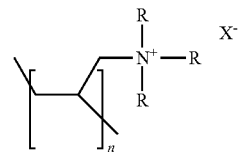

or a copolymer thereof, wherein n is an integer, each R, independently, is H or a lower alkyl (e.g., having between 1 and 5 carbon atoms, inclusive), alkylamino (e.g., having between 1 and 5 carbons atoms, inclusive, such as ethylamino) or aryl (e.g., phenyl) group, and each $X^-$ is an exchangeable negatively charged counterion; a first repeating unit having the formula

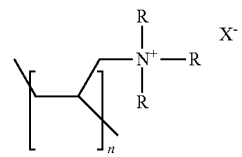

wherein n is an integer, each R, independently, is H or a lower alkyl (e.g., having between 1 and 5 carbon atoms, inclusive), alkylamino (e.g., having between 1 and 5 carbons atoms, inclusive, such as ethylamino) or aryl group (e.g., phenyl), and each $X^-$ is an exchangeable negatively charged counterion; and a second repeating unit having the formula

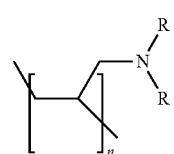

wherein each n, independently, is an integer and each R, independently, is H or a lower alkyl (e.g., having between 1 and 5 carbon atoms, inclusive), alkylamino (e.g., having between 1 and 5 carbons atoms, inclusive, such as ethylamino) or aryl group (e.g., phenyl); a repeating unit having the formula

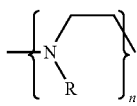

or a copolymer thereof, wherein n is an integer, and R is H or a lower alkyl (e.g., having between 1 and 5 carbon atoms, inclusive), alkylamino (e.g., having between 1 and 5 carbons atoms, inclusive, such as ethylamino) or aryl group (e.g., phenyl); a first repeating unit having the formula

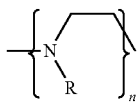

wherein n is an integer, and R is H or a lower alkyl (e.g., having between 1 and 5 carbon atoms, inclusive), alkylamino (e.g., having between 1 and 5 carbons atoms, inclusive, such as ethylamino) or aryl group (e.g., phenyl); and a second repeating unit having the formula

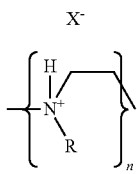

wherein each n, independently, is an integer and R is H or a lower alkyl (e.g., having between 1 and 5 carbon atoms, inclusive), alkylamino (e.g., having between 1 and 5 carbons atoms, inclusive, such as ethylamino) or aryl group (e.g., phenyl); a repeating group having the formula

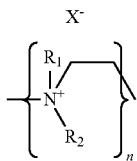

or a copolymer thereof, wherein n is an integer, and each $R_1$ and $R_2$, independently, is H or a lower alkyl (e.g., having between 1 and 5 carbon atoms, inclusive), and alkylamino (e.g., having between 1 and 5 carbons atoms, inclusive, such as ethylamino) or aryl group (e.g., phenyl), and each $X^-$ is an exchangeable negatively charged counterion, preferably, at least one of the R groups is a hydrogen group; a repeat unit having the formula

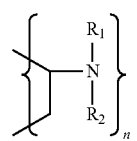

or a copolymer thereof, where n is an integer, each $R_1$ and $R_2$, independently, is H, an alkyl group containing 1 to 20 carbon atoms, an alkylamino group (e.g., having between 1 and 5 carbons atoms, inclusive, such as ethylamino), or an aryl group containing 1 to 12 atoms (e.g., phenyl); and a repeat unit having the formula

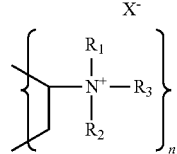

or a copolymer thereof, wherein n is an integer, each $R_1$, $R_2$ and $R_3$, independently, is H, an alkyl group containing 1 to 20 carbon atoms, an alkylamino group (e.g., having between 1 and 5 carbons atoms, inclusive, such as ethylamino), or an aryl group containing 1 to 12 atoms (e.g., phenyl), and each $X^-$ is an exchangeable negatively charged counterion.

The negatively charged counterions may be organic ions, inorganic ions, or combination thereof. The inorganic ions suitable for use in this invention include the halides (especially chloride), phosphate, phosphite, carbonate, bicarbonate, sulfate, bisulfate, hydroxide, nitrate, persulfate, sulfite, and sulfide. Suitable organic ions include acetate, ascorbate, benzoate, citrate, dihydrogen citrate, hydrogen citrate, oxalate, succinate, tartrate, taurocholate, glycocholate, and cholate. The polymer salt is preferably the hydrogen chloride salt and can include low salt or reduced salt forms of the polymer where, for example, the salt is present in an amount between about 4% and 30% based upon weight of polymer. Another example is sevelamer, which is stored and administered as a salt in which about 40% of the amine groups are protonated as the hydrochloride salt (about 18% by weight of the polymer is chloride). Another example is poly(allylamine) wherein about 9.0% to about 27.0% of the amine groups in the poly(allylamine) are protonated, such as poly (allylamine hydrochloride) where between about 4.0% and about 12.0% of the polymer, by weight, is chloride anion.

Preferred polymer hydrogels have the structures set forth as described above. The polymers are preferably cross-linked, in some cases by adding a cross-linking agent to the reaction mixture during polymerization. Examples of suitable cross-linking agents are diacrylates and dimethacrylates (e.g., ethylene glycol diacrylate, propylene glycol diacrylate, butylene glycol diacrylate, ethylene glycol dimethacrylate, propylene glycol dimethacrylate, butylene glycol dimethacrylate, polyethyleneglycol dimethacrylate, polyethyleneglycol diacrylate), methylene bisacrylamide, methylene bismethacrylamide, ethylene bisacrylamide, epichlorohydrin, toluene diisocyanate, ethylenebismethacrylamide, ethylidene bisacrylamide, divinyl benzene, bisphenol A dimethacrylate, bisphenol A diacrylate, 1,4 butanedioldiglycidyl ether, 1,2 ethanedioldiglycidyl ether, 1,3-dichloropropane, 1,2-dichloroethane, 1,3-dibromopropane, 1,2-dibromoethane, succinyl dichloride, dimethylsuccinate, acryloyl chloride, or pyromellitic dianhydride. The amount of cross-linking agent is typically between about 0.5 and about 75 weight %, and preferably between about 1 and about 25% by weight, based upon combined weight of cross-linking agent and monomer. In another embodiment, the cross-linking agent is present between about 2 and about 20% by weight.

In some cases the polymers are cross-linked after polymerization. One method of obtaining such cross-linking involves reaction of the polymer with difunctional crosslinkers, such as epichlorohydrin, succinyl dichloride, the diglycidyl ether of bisphenol A, pyromellitic dianhydride, toluene diisocyanate, and ethylenediamine.

In particular, the invention is useful for cross-linked poly (allylamine hydrochloride). More preferred is epichlorohydrin cross-linked poly(allylamine hydrochloride). This polymer hydrogel is characterized by a repeat unit having the formula

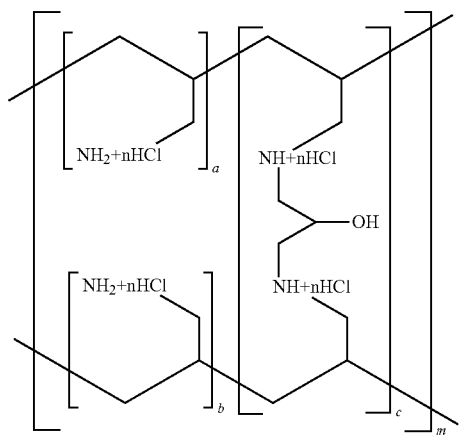

wherein a and b are the number of primary amine groups and a+b is about 9, c is the number of cross-linking groups and c is about 1, n is the fraction of protonated amines and n is about 0.4, and m is an integer. The polymer is called sevelamer and is sold under the trademark Renagel®. Another preferred polymer is colesevelam, sold under the trademark Welchol™. The polymer is epichlorohydrin cross-linked poly(allylamine) alkylated with decylbromide and trimethylammonium hexylbromide.

A substantial number of materials begin at or pass through a sticky, or cohesive, phase during drying operations. For example, it has been observed that cross-linked poly(allylamine hydrochloride) may enter a cohesive phase during drying at particular temperatures and moisture concentrations, for example such as at about 36 to 43° C. and about 80% solids content. During the cohesive phase the composition may become extremely rubbery and tough. Without being held to any particular theory, it is believed that the cohesive phase experienced during drying of cross-linked poly(allylamine hydrochloride) occurs as the polymer experiences a polymer glass transition, i.e, the polymer transitions from a rubbery to a glass state.

A polymer glass transition represents a phase transition wherein the polymer changes from a rubbery, elastic material to a glassy, brittle material as the temperature of the material is reduced below the glass transition temperature. At temperatures above the glass transition, a material tends to be soft and rubbery. As the temperature is decreased, the vibration amplitude of the polymer segments decrease causing the complex modulus of the polymer to increase exponentially. Upon further cooling the material will enter the glass transition. As a material passes through the glass transition by continued cooling of the polymer, it will become hard and brittle and, subsequently, the complex modulus will continue to rise until it reaches a glassy plateau.

Plasticizers generally work to reduce the modulus of a polymer at a particular temperature by lowering the polymer's glass transition temperature. Generally, as the concentration of the plasticizer is increased, the glass transition temperature of the composition occurs at progressively lower temperatures. (Fried, Polymer Science and Technology, Prentice Hall, N.J. 252-254 (1995)). This depression of the polymer glass transition temperature is often linearly dependent upon plasticizer concentration. (Rodriguez, Principals of Polymer Systems, $3^{rd}$ Ed., Hemisphere Publishing, NY 50-51 (1989)). The FIGURE shows the linear relationship between moisture content and polymer temperature during the cohesive phase of epichlorohydrin cross-linked poly(allylamine hydrochloride). The FIGURE was produced by measuring the loss on drying (LOD) and polymer temperature of epichlorohydrin cross-linked poly(allylamine hydrochloride), as it was dried in a Morton FM-130 Ploughshare Dryer, when the power required for agitation exceeded 15 amps.

Without being held to any particular theory, it is believed that water can act as a plasticizer for cross-linked poly(allylamine hydrochloride). During the early stages of drying it is believed that the temperature of cross-linked poly(allylamine hydrochloride) is well above its glass transition temperature. The FIGURE, however, demonstrates that epichlorohydrin cross-linked poly(allylamine hydrochloride) dried to a LOD of less than about 8% must pass through a cohesive phase if drying temperatures are kept lower than 55° C. or if the product is discharged from the dryer at ambient temperatures. This invention is based, in part, on the discovery that by removing liquid in the absence of agitation from a composition of cross-linked poly(allylamine), the problems associated with drying during the cohesive phase can be avoided. It is believed that by removing liquid in the absence of agitation, evaporative cooling reduces the temperature of the material below its glass transition temperature and, at the same time, removal of plasticizing water increases the glass transition temperature of the composition.

This invention is also based, in part, on the discovery that by increasing the temperature of a material prior to removing liquid in the absence of agitation, the likelihood of passing the material through the cohesive phase is increased. By increasing its temperature, a material can be dried to a lower LOD before the glass transition is approached. Furthermore, increasing the drying temperature prior to suspending agitation can allow greater moisture evaporation as the material experiences the cohesive phase.

In one aspect, the invention features a method of removing liquid from a composition. The method comprises (a) agitating the composition while removing liquid until the composition enters a cohesive phase; (b) halting agitation; (c) removing liquid from the composition in the absence of agitation until the composition passes through the cohesive phase; (d) resuming agitation; and (e) removing liquid from the composition while agitating the composition until the solids content of the composition reaches a pre-determined level. In one embodiment, the composition comprises a polymer. In another embodiment, the composition comprises a cross-linked polymer. Preferably, the composition comprises a hydrogel. More preferably, the composition comprises an organic polymer hydrogel used as an active pharmaceutical ingredient. In particular, the invention is useful for cross-linked poly(allylamine hydrochloride). Even more preferably, the composition comprises epichlorohydrin cross-linked poly(allylamine hydrochloride).

In some embodiments, the composition is agitated at a pressure P1 prior to entering the cohesive phase, and the liquid is removed from the composition in the absence of agitation at a pressure P2, where P2 is less than P1. In various embodiments, either P2 or both P1 and P2 are less than atmospheric pressure. In one embodiment, P1 is about 25 to 500 mbar absolute. In another embodiment, P1 is about 80 to 480 mbar absolute. In a preferred embodiment, P1 is about 50 to 200 mbar absolute. Even more preferred, P1 is about 65 to 160 mbar absolute, e.g., P1 is about 110 to 140 mbar absolute. In one embodiment, P2 is less than about 100 mbar absolute. In a preferred embodiment, P2 is less than about 60 mbar absolute. Even more preferred, P2 is less than about 13 mbar absolute.

In some embodiments, the composition is agitated at a temperature T1 prior to entering the cohesive phase, and the liquid is removed from the composition in the absence of agitation at a temperature T2, where T2 is less than T1. In some embodiments, T1 is less than about 80° C., T1 is about 30 to 80° C., or T1 is less than about 70° C. In a preferred embodiment, T1 is about 60 to 70° C. Preferably, the temperature of the composition is raised as high as possible, for example about 60 to 70° C., just before the material enters the cohesive phase. When a vacuum is applied to the material, the temperature drops rapidly. The higher the temperature just before the vacuum is applied, the more moisture will be removed. Even more preferred, T1 is about 65° C. In one embodiment, T2 is less than about 70° C. In a preferred embodiment, T2 is less than about 60° C., e.g., T2 is about 20 to 60° C.

In one aspect of the above mentioned method, agitation is resumed at a pressure P3, wherein P3 is less than atmospheric pressure. In a preferred embodiment, P3 is about 50 to 200 mbar absolute. In another aspect, the composition is agitated at a pressure P1 prior to entering the cohesive phase, liquid is removed from the composition in the absence of agitation at a pressure P2, and agitation is resumed at pressure P3, wherein P3 is substantially equal to P2. In one preferred embodiment, P2 and P3 are both less than atmospheric pressure, e.g., less than about 60 mbar absolute. Alternatively, P2 may be substantially less than P3. In another one preferred embodiment, P1 and P3 are both less than atmospheric pressure, e.g., about 50-200 mbar absolute. Alternatively, P3 may be substantially less than P1. In one embodiment, P1 is about 65 to 160 mbar absolute and P3 is less than about 80 mbar absolute.

In one embodiment, the method comprises (a) agitating a composition at a temperature T1 while removing liquid until the composition enters a cohesive phase, (b) halting the agitation, (c) removing liquid from the composition in the absence of agitation at a temperature T2 until the composition passes through the cohesive phase, (d) resuming agitation at a temperature T3, and (e) removing liquid from the composition while agitating the composition at a temperature T3 until the solids content of the composition reaches a pre-determined level, where T3 is less than T1. In a preferred embodiment, T1 is about 30 to 80° C. More preferred, T1 is about 60 to 70° C. In one embodiment, T3 is less than the glass transition temperature of the polymer composition at a given moisture content. In a preferred embodiment, T3 is about 30 to 60° C.

In another preferred embodiment the method comprises (a) agitating a composition at a temperature T1 while removing liquid until the composition enters a cohesive phase, (b) halting the agitation, (c) removing liquid from the composition in the absence of agitation at a temperature T2 until the composition passes through the cohesive phase, (d) resuming agitation at a temperature T3, and (e) removing liquid from the composition while agitating the composition at a temperature T3 until the solids content of the composition reaches a pre-determined level, where T3 is greater than T2.

Liquid can be removed from the composition in the absence of agitation until the composition is no longer in the cohesive phase. In one embodiment, liquid is removed from the composition in the absence of agitation for at least about 30 minutes. Preferably, liquid is removed from the composition in the absence of agitation for at least about one hour.

In another aspect, the invention relates to a method of removing liquid from a composition that comprises a cross-linked poly(allylamine). The method comprises (a) agitating the composition at a pressure, P1, about 65 to 160 mbar absolute and at a temperature, T1, about 60 to 70° C. while removing liquid until the composition enters a cohesive phase; (b) halting agitation; (c) removing liquid from the composition at a pressure, P2, less than about 60 mbar absolute and at a temperature, T2, less than about 60° C. in the absence of agitation for at least 30 minutes; (d) resuming agitation once the composition has passed through the cohesive phase; and (e) removing liquid from the composition while agitating the composition until the solids content of the composition reaches a pre-determined level.

In a preferred embodiment, the composition comprises a cross-linked polymer that is epichlorohydrin cross-linked poly(allylamine hydrochloride).

In a preferred embodiment, P1 is about 110 to 140 mbar absolute. In another preferred embodiment, T1 is about 65° C. In yet another preferred embodiment, liquid is removed from the composition in the absence of agitation for at least about one hour.

Generally, an apparatus suitable for drying a material that experiences a cohesive phase is a vessel with means for agitating the material, means for controlling the temperature of the contents of the vessel, and, optionally, means for controlling the pressure of the vessel. For example, a commercially available rotary vacuum dryer can be used to dry a material having a cohesive phase. Rotary vacuum dryers suitable for practicing the invention can include stationary shell, rotating shell, and rotating double-cone vacuum dryers. One example of a suitable dryer unit is a Morton FM-130 Ploughshare Dryer (Morton Machines Company Ltd., Motherwell, Scotland). Other suitable dryers can include spray dryers, calciners, microwave dryers, and fluidized beds. Measurement and control of temperature, pressure, agitation rate, and agitator power draw can be automated and integrated, e.g., through a process control system.

In one embodiment, upon being placed into a dryer, a wet material is agitated at a temperature T1 and pressure P1. The material may be dried by controlling either the pressure or the temperature of the dryer; if one of the pressure or temperature is set, the other is necessarily determined for a dryer of a given volume. In one embodiment, P1 is about atmospheric pressure or less than atmospheric pressure, for example about 25 to 500 mbar absolute. In another, P1 is about 80 to 480 mbar absolute. In a preferred embodiment, P1 is about 50 to 200 mbar absolute. Even more preferred, P1 is about 65 to 160 mbar absolute. In some embodiments, T1 is less than about 80° C., T1 is about 30 to 80° C., or T1 is less than about 70° C. In a preferred embodiment, T1 is about 60 to 70° C. Even more preferred, T1 is about 65° C.

As moisture is removed from the composition and the composition begins to approach its cohesive phase, fluctuations will be noted in the power draw of the agitator unit in the dryer, as the temperature, pressure, and humidity of the system change. For example, as the material approaches the cohesive phase, the humidity of the outlet air can drop, and the temperature of the air can rise. Just prior to the material entering the cohesive phase, it is preferred to raise the temperature of the composition to about 60 to 70° C., e.g., T1 is about 65° C. As soon as this temperature range is reached or agitator power draw increases substantially, agitation is halted. In a preferred embodiment, a vacuum is applied to the dryer. Preferably, the pressure in the dryer is reduced to less than about 100 mbar absolute. Even more preferably, the pressure of the dryer is reduced to less than about 60 mbar absolute, e.g., the pressure in the dryer is reduced to less than about 13 mbar absolute. Once a vacuum is applied, the dryer and material temperatures drop rapidly.

In a preferred aspect of the invention, the differential between the temperature during agitation and the temperature when agitation stops is as great as possible to encourage moisture evaporation. Preferably, the temperature of the composition is raised as high as possible, for example about 60 to 70° C., just before the material enters the cohesive phase. When a vacuum is applied to the material, the temperature drops rapidly. The higher the temperature just before the vacuum is applied, the more moisture will be removed.

In a preferred embodiment, liquid is removed from the composition in the absence of agitation at a temperature $T2$ and pressure $P2$, which are lower than the initial drying temperature $T1$ and pressure $P1$. During the cohesive phase the material can remain stationary under full vacuum, or nearly full vacuum, while moisture is removed by way of the vacuum mechanism. While the product is stationary under reduced pressure, evaporative cooling considerably reduces the product temperature and moisture. During this stage, moisture is removed from the interior of the material. In one embodiment, $P2$ is less than about 100 mbar absolute. In a preferred embodiment, $P2$ is less than about 60 mbar absolute, e.g., $P2$ is less than about 13 mbar absolute. In one embodiment, $T2$ is less than about 70° C. In a preferred embodiment, $T2$ is less than about 60° C., e.g., $T2$ is about 20 to 60° C. In one embodiment, liquid is removed from the composition in the absence of agitation for a period of at least about 30 minutes. In a preferred embodiment, liquid is removed from the composition in the absence of agitation for a period of at least about one hour.

Once the cohesive phase has passed, agitation may be resumed and drying may be continued to obtain a composition having the desired level of moisture. In one embodiment, the composition is dried under vacuum, e.g., for about 30 minutes to 4 hours.

In an alternative embodiment, two dryers may be used in series. The use of two dryers in series can be desirable for high throughput applications. The first, or primary, dryer can be used to remove excess moisture quickly from material that is not yet at the cohesive phase. Then the second dryer can dry the material as it approaches the cohesive phase and as it passes through the cohesive phase. Both dryers can have means for agitating the material to be dried and also means for altering the pressure in the drying vessel.

The wet material in the primary dryer is dried at temperature $T1$ and pressure $P1$. Just prior to the onset of the cohesive phase the material is transferred to a secondary dryer, Material transferred into the secondary dryer is, upon entry of its cohesive phase, subjected to temperature $T2$ and pressure $P2$, wherein $T2$ and $P2$ are less than $T1$ and $P1$, respectively. Agitation, if applied, is suspended while the material is in the cohesive phase. Once the cohesive phase has passed, agitation can be resumed.

In one embodiment, the primary dryer is a spray dryer. In such a dryer, the composition enters through the top of the dryer. As the material enters the dryer, it is atomized. As the particles fall through the dryer, the moisture on the exterior of the particles evaporates. In this first dryer, the material is subjected to very high heat, e.g., the temperature of the dryer can be as high as about 100 to 600° C. Preferably, the temperature of the material only reaches about 50 to 60° C., though, as a result of evaporative cooling. The material remains in such a primary dryer for a very short time period, e.g., about 10 seconds.

The material then exists the primary dryer and enters the secondary dryer. For example, the material can fall out of the bottom of the first dryer, into the second dryer, which can be, for example, a fluid bed dryer. In the fluid bed dryer, the material can reach the temperature of the dryer, so the temperature of the dryer should not exceed about 20 to 60° C. The particles in a fluid bed dryer are suspended in a stream of air. The particles start out as a suspension, but as the particles approach the cohesive phase, they begin to agglomerate and drop to a stationary surface of the dryer.

Alternatively, a single dryer with two different drying stages can be used. The first stage can be used to dry the material before it enters the cohesive phase, and the second stage can be used to dry to material as is approaches and passes through the cohesive phase. Each of the dryer stages can have means for agitating the material to be dried as well as means for altering the pressure in the drying vessel of the respective stage.

In one embodiment, a composition is dried in a first dryer stage at a temperature $T1$ and a pressure $P1$. As the cohesive phase of the material approaches, the material is transferred using a means for conveyance such as, for example, a conveyor belt, to the second dryer stage. There, in the second stage, the material is dried at temperature $T2$ and pressure $P2$, where $T2$ is less than $T1$ and $P2$ is less than $P1$.

The invention will be further described in the following example, which does not limit the scope of the invention described in the claims.

Example

A wet epichlorohydrin crosslinked poly(allylamine hydrochloride) gel having mass of 27.2 kg and a solids content of 42.3% was fed into a Morton FM-130 Ploughshare Dryer. The moisture in the gel was an aqueous 70% (v/v) isopropanol solution. Drying was initiated by starting the main drive agitator and pulling a vacuum. The mixing speed was set at 80 RPM, and the heating jacket temperature was set at 80° C. The vacuum during drying was adjusted to 38-60 Torr by opening an air bleed valve into the vacuum pump.

Drying was allowed to continue under the above conditions until the onset of the cohesive phase. As the cohesive phase approached, the product temperature and vacuum level in the dryer steadily rose, and power draw fluctuations in the main drive steadily increased. Once the power draw fluctuations exceeded 14 amps on the main drive shaft, agitation was stopped, and the air bleed into the vacuum pump was shut off. The solids content of the product at this time was 90.5%. The product was allowed to sit in the dryer under full vacuum for approximately 30 minutes. After 30 minutes, agitation was restarted and no power draw fluctuations were detected. The solids content of the product at this time was 93.7%. Drying continued under full vacuum for an additional 25 minutes, after which time the product was discharged from the dryer.

Other Embodiments

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of removing liquid from a composition comprising:
   a. agitating the composition while removing liquid from the composition in a first dryer until just prior to entering a cohesive phase;
   b. halting agitation;
   c. transferring the composition to a second dryer where the composition enters a cohesive phase, and
   d. removing liquid from the composition until the solids content of the composition reaches a pre-determined level.

2. The method of claim 1 further comprising agitating the composition in the second dryer while removing liquid from the composition.

3. The method of claim 2, wherein the temperature in the first dryer is T1 and the pressure in the first dryer is P1.

4. The method of claim 3, wherein upon entry of the cohesive phase the temperature in the second dryer is T2 and the pressure in the second dryer is P2, wherein T2 and P2 are less than T1 and P1, respectively.

5. The method of claim 4, wherein T1 is about 100 to 600° C. and T2 is about 20 to 60° C.

6. The method of claim 5, wherein the composition is a polymer hydrogel.

7. The method of claim 5, wherein the composition is a pharmaceutical polymer.

8. The method of claim 7, wherein the composition is sevelamer hydrochloride.

9. The method of claim 5, wherein the first dryer is a spray dryer.

10. The method of claim 9, wherein the second dryer is a fluid bed dryer.

* * * * *